United States Patent
Park et al.

(10) Patent No.: US 10,715,417 B2
(45) Date of Patent: Jul. 14, 2020

(54) METHOD FOR CONFIGURING STREAM COMMUNICATION PATH IN NETWORK

(71) Applicants: HYUNDAI MOTOR COMPANY, Seoul (KR); KIA MOTORS CORPORATION, Seoul (KR); Industry-University Cooperation Foundation Hanyang University, Seoul (KR)

(72) Inventors: Seong Jin Park, Suwon-si (KR); Woo Sub Kim, Namyangju-si (KR); Ju Ho Lee, Seoul (KR); SungKwon Park, Seoul (KR)

(73) Assignees: Hyundai Motor Company, Seoul (KR); Kia Motors Corporation, Seoul (KR); Industry-University Cooperation Foundation Hanyang University, Seoul (KR)

(*) Notice: Subject to any disclaimer, the term of this patent is extended or adjusted under 35 U.S.C. 154(b) by 100 days.

(21) Appl. No.: 15/592,643

(22) Filed: May 11, 2017

(65) Prior Publication Data

US 2017/0331719 A1    Nov. 16, 2017

(30) Foreign Application Priority Data

May 12, 2016   (KR) .................. 10-2016-0058252
Feb. 27, 2017  (KR) .................. 10-2017-0025333

(51) Int. Cl.
  *H04L 12/54*    (2013.01)
  *H04L 12/28*    (2006.01)
  *H04L 12/755*   (2013.01)
  *H04L 12/701*   (2013.01)
  *H04L 12/733*   (2013.01)

(52) U.S. Cl.
  CPC ............ *H04L 45/021* (2013.01); *H04L 45/00* (2013.01); *H04L 45/20* (2013.01)

(58) Field of Classification Search
  CPC ........ H04L 45/021; H04L 45/00; H04L 45/20
  See application file for complete search history.

(56) References Cited

U.S. PATENT DOCUMENTS

2002/0176370 A1* 11/2002 Ohba ............... H04L 49/309
                                                 370/252
2007/0070909 A1*  3/2007 Reeve .............. H04L 45/00
                                                 370/238

(Continued)

OTHER PUBLICATIONS

Gui et al. (Improving Localization Accuracy Using Selective 3-Anchor DV-hop Algorithm, Sep. 5-8, 2011, IEEE) (Year: 2011).*

(Continued)

*Primary Examiner* — Marharishi V Khirodhar
(74) *Attorney, Agent, or Firm* — Morgan, Lewis & Bockius LLP

(57) ABSTRACT

A method for configuring a communication path comprises: receiving a first frame requesting to configure a communication path through which a stream is transmitted; configuring a table of the first communication node based on information included in the first frame, when a second frame having a same stream identifier as a stream identifier of the first frame is not received; increasing a hop count of the first frame; and transmitting the first frame including the increased hop count.

11 Claims, 7 Drawing Sheets

(56) References Cited

U.S. PATENT DOCUMENTS

| | | | | |
|---|---|---|---|---|
| 2008/0080657 A1* | 4/2008 | Aziz | ................ | H03L 7/0814 |
| | | | | 375/376 |
| 2011/0058554 A1* | 3/2011 | Jain | ................ | H04L 45/00 |
| | | | | 370/392 |
| 2015/0365255 A1* | 12/2015 | Gunther | ................ | H04L 65/80 |
| | | | | 370/401 |

OTHER PUBLICATIONS

Jin Chen (Fully distributed work-conserving MAC protocols for opportunistic optical Hyperchannels): (Year: 2009).*
Broadcom (SRP Stream Path Selection, IEEE 802.1 AVB WG, Mar. 2011) (Year: 2011).*
Michael (short paper: Jamming resistant multi-path routing for reliable intruder detection in underwater networks, 2011) (Year: 2011).*
Jin Chen (Fully distributed work-conserving MAC protocols for opportunistic optical Hyperchannels, 2009) (Year: 2009).*
IEEE P802.1 Qat SRP (MSRP) Talker Advertise packet format, Oct. 15, 2008). (Year: 2008).*
Gui et al. (Improving Localization Accuracy Using Selective 3-Anchor DV-hop Algorithm, Sep. 5-8, 2011, IEEE) also teaches this stage, see section 2] (Year: 2011).*

* cited by examiner

METHOD FOR CONFIGURING STREAM COMMUNICATION PATH IN NETWORK

CROSS-REFERENCE TO RELATED APPLICATIONS

This application claims the benefits of priority to Korean Patent Application No. 10-2016-0058252 filed on May 12, 2016 and Korean Patent Application No. 10-2017-0025333 field on Feb. 27, 2017 in the Korean Intellectual Property Office (KIPO), the entirety of which is incorporated by reference as if fully set forth herein.

TECHNICAL FIELD

The present disclosure relates to a method for configuring a communication path of a stream, and more specifically, to a method for configuring a communication path of a stream based on a stream reservation protocol (SRP) in an Ethernet-based vehicle network.

BACKGROUND

Electronic devices installed in a vehicle have been increased significantly in their number and variety along with recent digitalization of vehicle parts. Generally, electronic devices may be used throughout the vehicle, such as in a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via the vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

The telematics system and the infotainment system, like most enhanced safety systems of a vehicle do, require higher transmission rates and system expandability. However, the CAN, FlexRay-based network, and the like may not sufficiently support such requirements. The MOST-based network, in particular, may support a higher transmission rate than the CAN or the FlexRay-based network. However, applying the MOST-based network to vehicle networks can be costly. Due to these limitations, an Ethernet-based network is often utilized as a vehicle network. The Ethernet-based network may support bi-directional communication through one pair of windings and may support a transmission rate of up to 10 Gbps. The Ethernet-based vehicle network may include a plurality of communication nodes. The communication node may be a gateway, a switch (or bridge), an end node, or the like.

In the vehicle network, an electronic device may transmit a stream based on a stream reservation protocol (SRP). For example, a communication path may be configured between an electronic device (hereinafter, referred to as a 'talker') that provides a service (e.g., transmits a stream associated with the service) and an electronic device (hereinafter, referred to as a 'listener') that receives the service (e.g., receives the stream associated with the service), and resources required for transmission of the stream through the communication path may be reserved. After the reservation of the resources, the talker may transmit the stream. The stream transmitted by the talker may be transmitted to the listener via the reserved resources.

On the other hand, a frame (hereinafter, referred to as an 'advertise frame') used for configuring a communication path in a vehicle network may be transmitted through a plurality of routes, and a specific electronic device (e.g., a switch or a bridge) may receive the same advertisement frames (e.g., advertisement frames having the same stream ID) from the plurality of routes (or a plurality of ports). In this case, due to a collision between the same advertisement frames, it may be impossible to configure a communication path in the specific electronic device.

SUMMARY

The present disclosure provides methods for configuring a communication path in a vehicle network.

In accordance with embodiments of the present disclosure, a method for configuring a communication path, performed in a first communication node in a vehicle network, may be provided. The method may comprise receiving a first frame requesting to configure a communication path through which a stream is transmitted; configuring a table of the first communication node based on information included in the first frame, when a second frame having a same stream identifier as a stream identifier of the first frame is not received; increasing a hop count of the first frame; and transmitting the first frame including the increased hop count.

The hop count may indicate a number of communication nodes through which the first frame has passed in the vehicle network.

The first communication node may support a multiple medium access control (MAC) reservation protocol (MMRP), a multiple virtual local area network reservation protocol (MVRP), and a multiple stream reservation protocol (MSRP).

The first communication node may by a switch or a bridge.

Each of the first frame and the second frame may be an advertise frame, and the advertise frame may include a stream identifier, a stream reservation (SR) class, an accumulated latency, and a hop count.

The table may be a stream reservation protocol (SRP) table used for configuration of a communication path.

The method may further comprise comparing the hop count of the first frame with a hop count of a third frame, when the third frame having a stream identifier identical to a stream identifier of the first stream is received; configuring the table of the first communication node based on information included in a frame having a lower hop count among the first frame and the third frame, when the hop count of the first frame is not identical to the hop count of the third frame; increasing the hop count of the frame having the lower hop count among the first frame and the third frame; and transmitting the frame having the increased hop count.

The method may further comprise comparing an accumulated latency of the first frame with an accumulated latency of the third frame, when the hop count of the first frame is identical to the hop count of the third frame; configuring the table of the first communication node based on information included in a frame having a lower accumulated latency among the first frame and the third frame, when the accumulated latency of the first frame is not identical to the accumulated latency of the third frame; increasing the hop count of the frame having the lower accumulated latency among the first frame and the third frame; and transmitting the frame having the increased hop count.

The method may further comprise comparing a port number of a port through which the first frame is received with a port number of a port through which the third frame is received, when the accumulated latency of the first frame is identical to the accumulated latency of the third frame; configuring the table of the first communication node based on information included in a frame received through a port having a lower port number among the first frame and the third frame; increasing the hop count of the frame received through the port having the lower port number among the first frame and the third frame; and transmitting the frame having the increased hop count.

The method may further comprise comparing an accumulated latency of the first frame with an accumulated latency of a third frame, when the third frame having a stream identifier identical to a stream identifier of the first stream is received; configuring the table of the first communication node based on information included in a frame having a lower accumulated latency among the first frame and the third frame, when the accumulated latency of the first frame is not identical to the accumulated latency of the third frame; increasing the hop count of the frame having the lower accumulated latency among the first frame and the third frame; and transmitting the frame having the increased hop count.

Further, in accordance with embodiments of the present disclosure, a first communication node constituting a vehicle network comprising a processor and a memory storing at least one instruction executed by the processor may be provided. Also, the at least one instruction may be configured to receive a first frame requesting to configure a communication path through which a stream is transmitted; configure a table of the first communication node based on information included in the first frame, when a second frame having a same stream identifier as a stream identifier of the first frame is not received; increase a hop count of the first frame; and transmit the first frame including the increased hop count.

The hop count may indicate a number of communication nodes through which the first frame has passed in the vehicle network.

The first communication node may support a multiple medium access control (MAC) reservation protocol (MMRP), a multiple virtual local area network reservation protocol (MVRP), and a multiple stream reservation protocol (MSRP).

Each of the first frame and the second frame may be an advertise frame, and the advertise frame may include a stream identifier, a stream reservation (SR) class, an accumulated latency, and a hop count.

The at least one instruction may be further configured to compare the hop count of the first frame with a hop count of a third frame, when the third frame having a stream identifier identical to a stream identifier of the first stream is received; configure the table of the first communication node based on information included in a frame having a lower hop count among the first frame and the third frame, when the hop count of the first frame is not identical to the hop count of the third frame; increase the hop count of the frame having the lower hop count among the first frame and the third frame; and transmit the frame having the increased hop count.

The at least one instruction may be further configured to compare an accumulated latency of the first frame with an accumulated latency of the third frame, when the hop count of the first frame is identical to the hop count of the third frame; configure the table of the first communication node based on information included in a frame having a lower accumulated latency among the first frame and the third frame, when the accumulated latency of the first frame is not identical to the accumulated latency of the third frame; increase the hop count of the frame having the lower accumulated latency among the first frame and the third frame; and transmit the frame having the increased hop count.

The at least one instruction may be further configured to compare a port number of a port through which the first frame is received with a port number of a port through which the third frame is received, when the accumulated latency of the first frame is identical to the accumulated latency of the third frame; configure the table of the first communication node based on information included in a frame received through a port having a lower port number among the first frame and the third frame; increase the hop count of the frame received through the port having the lower port number among the first frame and the third frame; and transmit the frame having the increased hop count.

The at least one instruction may be further configured to compare an accumulated latency of the first frame with an accumulated latency of a third frame, when the third frame having a stream identifier identical to a stream identifier of the first stream is received; configure the table of the first communication node based on information included in a frame having a lower accumulated latency among the first frame and the third frame, when the accumulated latency of the first frame is not identical to the accumulated latency of the third frame; increase the hop count of the frame having the lower accumulated latency among the first frame and the third frame; and transmit the frame having the increased hop count.

According to the embodiments of the present disclosure, when a plurality of advertise frames having a same stream ID are received through a plurality of routes (or a plurality of ports) in a vehicle network, a communication node (for example, a switch or a bridge) may select one of the plurality of routes based on hop counts and accumulated latencies of the plurality of advertise frames and port numbers of ports through which the plurality of advertise frames are received. The selected route can be used as a communication path for transmission an AVB stream. That is, even when a plurality of advertise frames having a same stream ID are received through a plurality of routes, the communication node can properly establish a communication path, and thus the performance of the vehicle network can be enhanced.

BRIEF DESCRIPTION OF DRAWINGS

Embodiments of the present disclosure will become more apparent by describing in detail forms of the present disclosure with reference to the accompanying drawings, in which.

Figure 1:
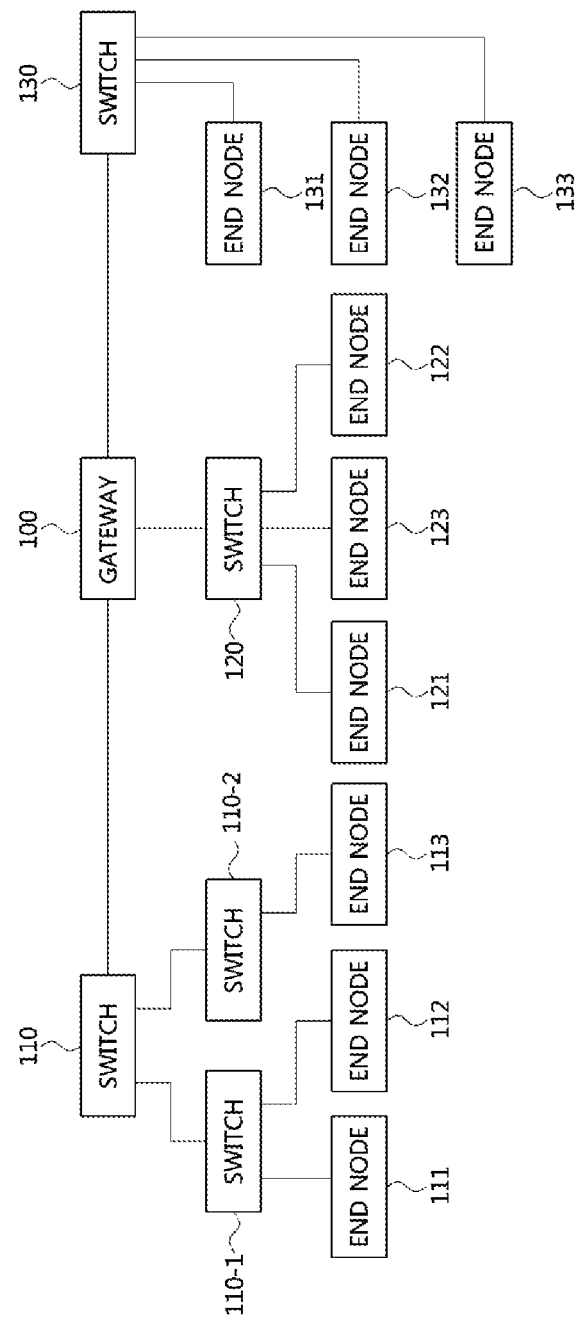
FIG. 1 is a diagram illustrating a vehicle network topology according to a first embodiment of the present disclosure.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/control unit may perform one or more of the processes described further below, and the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a diagram illustrating a vehicle network topology according to a first embodiment of the present disclosure.

As shown in FIG. 1, a communication node included in the vehicle network may be a gateway, a switch (or bridge), or an end node. The gateway 100 may be connected with at least one switch 110, 110-1, 110-2, 120, and 130 and may be configured to connect different networks. For example, the gateway 100 may support connection between a switch which supports a controller area network (CAN) (e.g., FlexRay, media oriented system transport (MOST), or local interconnect network (LIN)) protocol and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of end nodes 111, 112, 113, 121, 122, 123, 131, 132, and 133 connected to the switch.

The end nodes 111, 112, 113, 121, 122, 123, 131, 132, and 133 may include an electronic control unit (ECU) configured to control various types of devices mounted within a vehicle. For example, the end nodes 111, 112, 113, 121, 122, 123, 131, 132, and 133 may include the ECU included in an infotainment device (e.g., a display device, a navigation device, and an around view monitoring device).

The communication nodes (e.g., a gateway, a switch, an end node, or the like) included in the vehicle network may be connected in a star topology, a bus topology, a ring topology, a tree topology, a mesh topology, or the like. In addition, the communication nodes of the vehicle network may support the CAN protocol, the FlexRay protocol, the MOST protocol, the LIN protocol, or the Ethernet protocol. Embodiments of the present disclosure may be applied to the foregoing network topologies. The network topology to which forms of the present disclosure may be applied is not limited thereto and may be configured in various ways.

Figure 2:
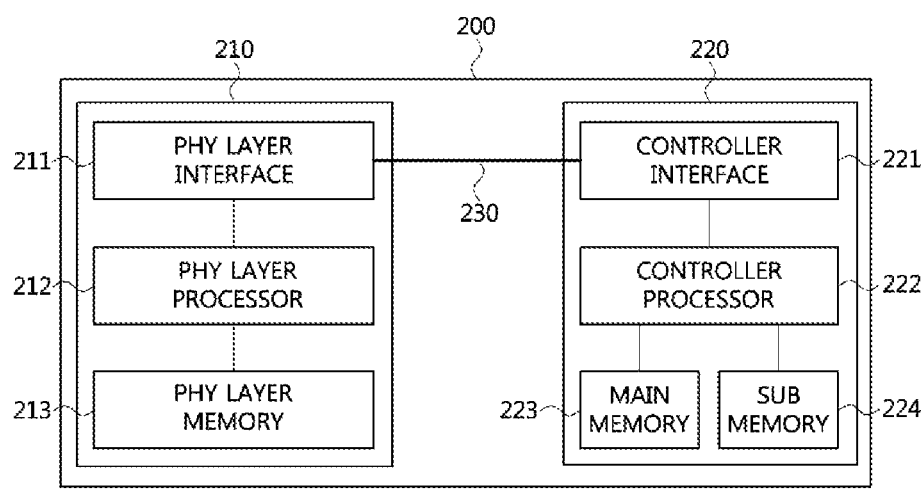
FIG. 2 is a diagram illustrating a communication node constituting a vehicle network according to embodiments of the present disclosure.

FIG. 2 is a diagram illustrating a communication node constituting a vehicle network according to embodiments of the present disclosure. Notably, the various methods discussed below may be executed by a controller having a processor and a memory.

As shown in FIG. 2, a communication node 200 of a network may include a physical (PHY) layer 210 and a controller 220. In addition, the communication node 200 may further include a regulator (not shown) for supplying power. In particular, the controller 220 may be implemented to include a medium access control (MAC) layer. A PHY layer 210 may be configured to receive or transmit signals from or to another communication node. The controller 220 may be configured to control the PHY layer 210 and perform various functions (e.g., an infotainment function, or the like.). The PHY layer 210 and the controller 220 may be implemented as one system on chip (SoC), or alternatively may be implemented as separate chips.

Furthermore, the PHY layer 210 and the controller 220 may be connected via a media independent interface (MII) 230. The MII 230 may include an interface defined in the IEEE 802.3 and may include a data interface and a management interface between the PHY layer 210 and the controller 220. One of a reduced MII (RMII), a gigabit MII (GMII), a reduced GMII (RGMII), a serial GMII (SGMII), a 10 GMII (XGMII) may be used instead of the MII 230. A data interface may include a transmission channel and a reception channel, each of which may have an independent clock, data, and a control signal. The management interface may include a two-signal interface, one signal for the clock and one signal for the data.

Particularly, the PHY layer 210 may include a PHY layer interface 211, a PHY layer processor 212, and a PHY layer memory 213. The configuration of the PHY layer 210 is not limited thereto, and the PHY layer 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to execute operations of the PHY layer interface 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller 220 may be configured to monitor and control the PHY layer 210 using the MII 230. The controller 220 may include a controller interface 221, a controller processor 222, a main memory 223, and a sub memory 224. The configuration of the controller 220 is not limited thereto, and the controller 220 may be configured in various ways. The controller interface 221 may be configured to receive a signal from the PHY layer 210 (e.g., the PHY layer interface 211) or an upper layer (not shown), transmit the received signal to the controller processor 222, and transmit the signal received from the controller processor 222 to the PHY layer 210 or the upper layer. The controller processor 222 may further include independent memory control logic or integrated memory control logic for controlling the controller interface 221, the main memory 223, and the sub memory 224. The memory control logic may be implemented to be included in the main memory 223 and the sub memory 224 or may be implemented to be included in the controller processor 222.

Furthermore, each of the main memory 223 and the sub memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The sub memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

A method performed by a communication node and a corresponding counterpart communication node in a vehicle network will be described below. Although the method (e.g., signal transmission or reception) performed by a first communication node, the method is applicable to a second communication node that corresponds to the first communication node. In other words, when an operation of the first communication node is described, the second communication node corresponding thereto may be configured to perform an operation that corresponds to the operation of the first communication node. Additionally, when an operation of the second communication node is described, the first communication node may be configured to perform an operation that corresponds to an operation of a switch.

Figure 3:
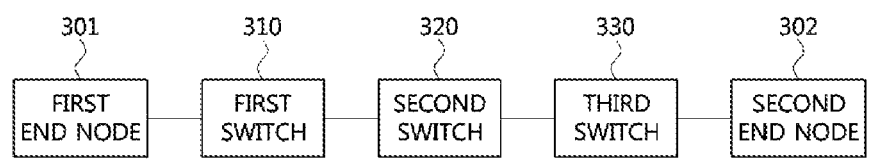
FIG. 3 is a diagram illustrating a vehicle network topology according to a second embodiment of the present disclosure.
Figure 4:
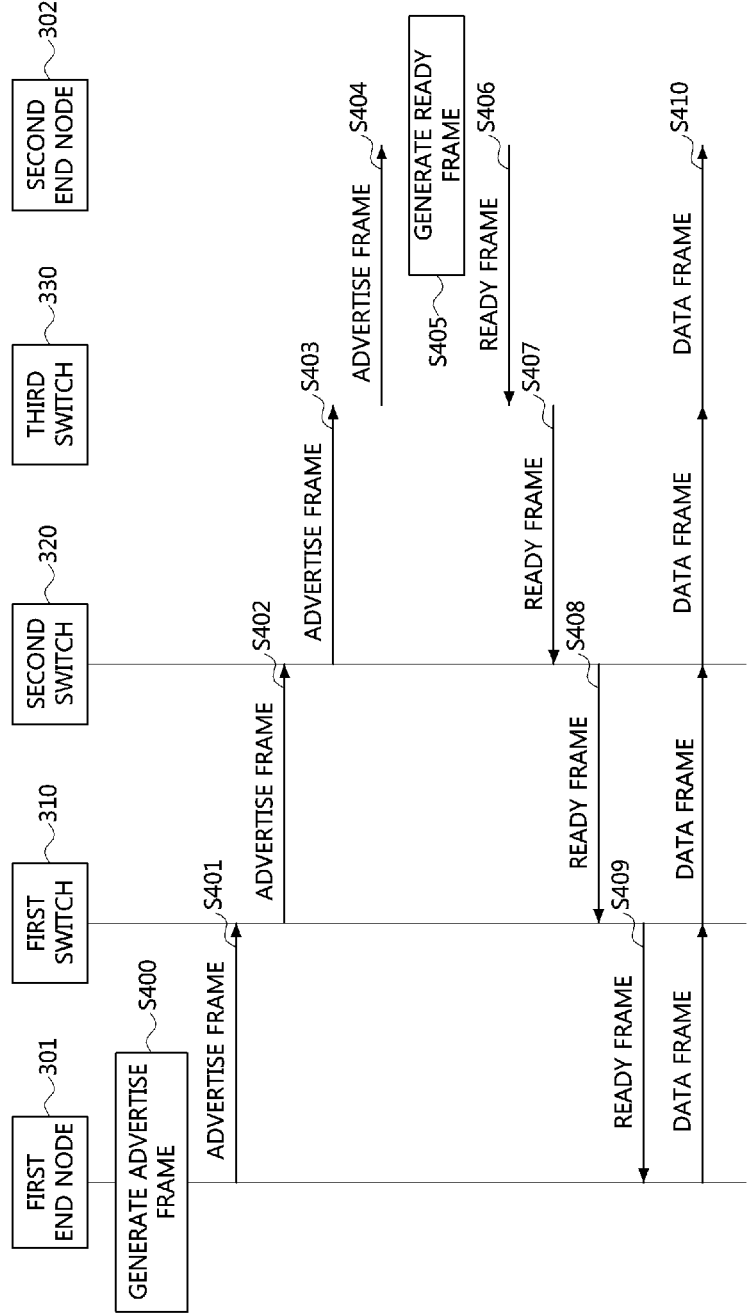
FIG. 4 is a sequence chart illustrating a frame transmission method based on a stream reservation protocol according to a first embodiment of the present disclosure.

FIG. 3 is a diagram illustrating a vehicle network topology according to a second embodiment of the present disclosure, and FIG. 4 is a sequence chart illustrating a frame transmission method based on a stream reservation protocol according to a first embodiment of the present disclosure.

Referring to FIG. 3 and FIG. 4, each of communication nodes 301, 302, 310, 320, and 330 constituting a vehicle network may have the same or similar configuration as the communication node 200 described with reference to FIG. 2, and support a Multiple MAC reservation protocol (MMRP), a multiple VLAN (virtual local area network) reservation protocol (MVRP), a multiple SRP (MSRP), etc. The first end node 301 may be a talker providing a service (e.g., transmitting a stream associated with the service), and the second end node 302 may be a listener receiving the service from the talker (e.g., receiving the stream associated with the service). Each of the switches 310, 320, and 330 may be a bridge. Here, the stream may comprise a plurality of consecutive frames. The frames may include audio video bridging (AVB) data, and the AVB data may have a form defined in the AVB specification.

The data included in the frames may have a priority, and the priority may be classified into a stream reservation (SR) class, a best effort (BE) class, or the like. The priority of the SR class may be higher than that of the BE class. The SR class may also be classified into a SR class A and a SR class B. Also, the priority of the SR class A may be equal to or higher than that of the SR class B. The priority of AVB data may be set to the SR class A or the SR class B. Table 1 below shows priorities of respective classes.

TABLE 1

|  | The number of priority levels | | | | | | |
| --- | --- | --- | --- | --- | --- | --- | --- |
|  | 2 | 3 | 4 | 5 | 6 | 7 | 8 |
| BE class | 0 | 0 | 0 | 0 | 0 | 0 | 1 |
|  | 0 | 0 | 0 | 0 | 0 | 0 | 0 |
| SR class B | 1 | 1 | 2 | 3 | 4 | 5 | 6 |
| SR class A | 1 | 2 | 3 | 4 | 5 | 6 | 7 |
| BE class | 0 | 0 | 1 | 1 | 1 | 1 | 2 |
|  | 0 | 0 | 1 | 1 | 1 | 2 | 3 |
|  | 0 | 0 | 1 | 2 | 2 | 3 | 4 |
|  | 0 | 0 | 1 | 2 | 3 | 4 | 5 |

The higher priority level indicates the higher priority. In case that two priority levels 0 and 1 are used, the priority level of the SR class A and SR class B may be set to '1', and the priority level of the BE class may be set to '0'. In case that three priority levels 0, 1, and 2 are used, the priority of SR class A may be set to '2', the priority of SR class B may be set to '1', and the priority of the BE class may be set to '0'. In case that four priority levels 0, 1, 2, and 3 are used, the priority of SR class A may be set to '3', the priority of SR class B may be set to '2', and the priority of the BE class may be set to '1' or '0'. In case that five priority levels 0, 1, 2, 3, and 4 are used, the priority of SR class A may be set to '4', the priority of SR class B may be set to '3', and the priority of the BE class may be set to '0', '1', or '2'.

In case that six priority levels 0, 1, 2, 3, 4, and 5 are used, the priority of SR class A may be set to '5', the priority of SR class B may be set to '4', and the priority of the BE class may be set to '0', '1', '2', or '3'. In case that seven priority levels 0, 1, 2, 3, 4, 5, and 6 are used, the priority of SR class A may be set to '6', the priority of SR class B may be set to '5', and the priority of the BE class may be set to '0', '1', '2', '3', or '4'. In case that eight priority levels 0, 1, 2, 3, 4, 5, 6, and 7 are used, the priority of SR class A may be set to '7', the priority of SR class B may be set to '6', and the priority of the BE class may be set to '0', '1', '2', '3', '4', or '5'.

On the other hand, the first end node 301 may generate an advertise frame to notify of providing a service (e.g., transmitting a stream associated with the service) (S400). The advertise frame may request to configure a communication path used for transmitting the stream. The advertise frame may include at least one of information elements described in Table 2 below.

TABLE 2

| Information Element | Description |
| --- | --- |
| Stream ID | Identifier of a stream to be transmitted for a service |
| Declaration Type | Declaration type of a talker or a listener |
| Data Frame Parameter | Destination address and VLAN ID of a frame |
| Traffic Specification | Maximum size of frame and Maximum inter-frame interval |
| Data Frame Priority | Priority of frame, which is used in a queue |
| Rank | Priority of stream |
| Accumulated Latency | Latency generated in a communication path between a talker and a listener |
| Failure Information | Identifier of a switch (or, bridge) that fails resource reservation, and failure code |

The information elements included in the advertise frame may be configured as follows.

Figure 5:
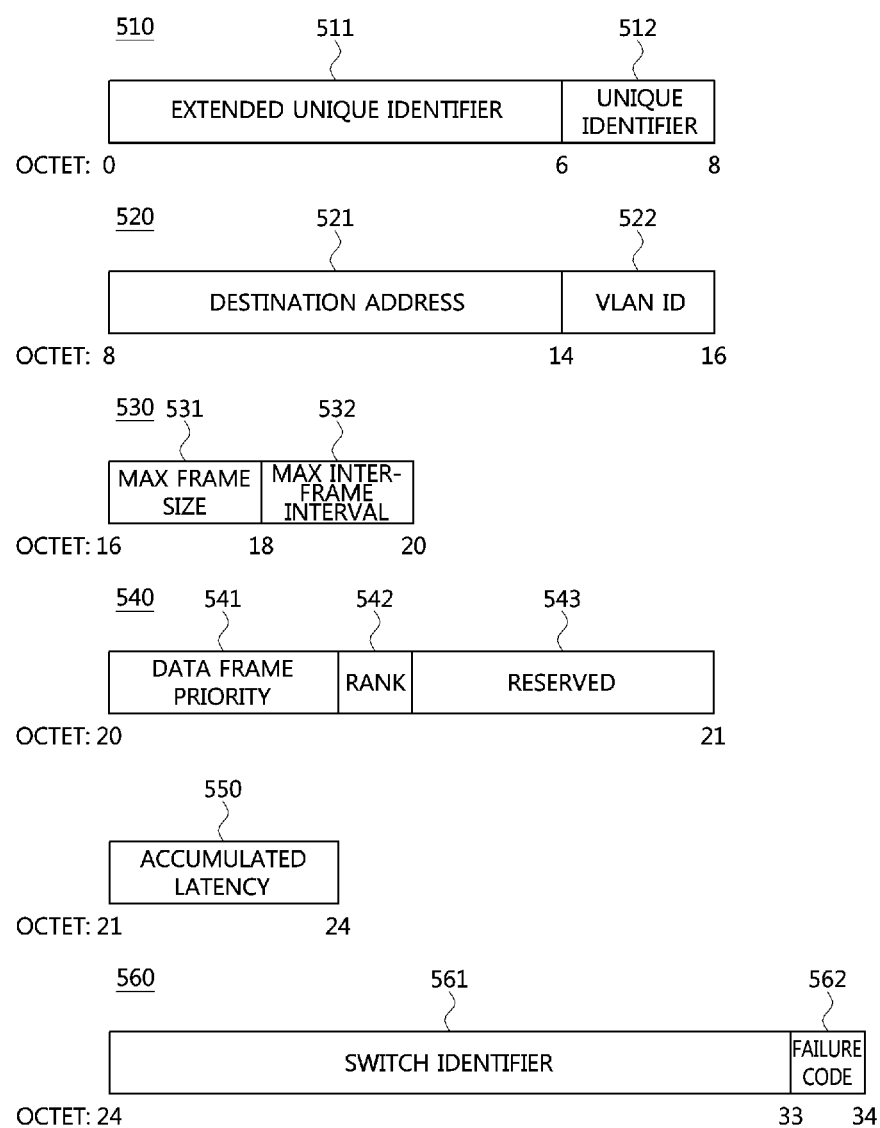
FIG. 5 is a block diagram illustrating information elements included in an advertise frame.

FIG. 5 is a block diagram illustrating information elements included in an advertise frame.

Referring to FIG. 5, a stream identifier (ID) field 510 may include an extended unique identifier (EUI) (or MAC address) field 511 having a size of 6 octets and a unique identifier (UI) field 512 having a size of 2 octets. The EUI field 511 may indicate a particular vehicle system (e.g., a power train control system, a body control system, a chassis control system, a multimedia system, etc.). The UI field 512 may be used to distinguish streams within such the particular vehicle system indicated by the EUI field 511.

A data frame parameter field 520 may include a destination address field 521 having a size of 6 octets and a VLAN ID field 522 having a size of 2 octets. For example, the destination address field 521 may indicate a MAC address of the second end node 302. The VLAN ID field 522 may indicate a VLAN to which the first end node 301 (or the second end node 302) belongs.

A traffic specification field 530 may include a maximum frame size field 531 having a size of 2 octets and a maximum inter-frame interval field 532 having a size of 2 octets. The maximum frame size field 531 may indicate the maximum size of the frame. The maximum inter-frame interval field 532 may indicate the maximum interval between frames.

A priority/rank field 540 may include a data frame priority field 541 having a size of 3 bits, a rank field 542 having a size of 1 bit, and a reserved field 543 having a size of 4 bits. The data frame priority field 541 may indicate the priority of the frame (or data contained in the frame) used in a queue and may indicate the priority level described with reference to Table 1. The rank field 542 may indicate the priority of the stream.

For example, each of the switches 310, 320, and 330 may receive requests to reserve resources (e.g., bandwidth) for transmission of a plurality of streams (e.g., a first stream and a second stream), and reserve respective resources for transmission of the plurality of streams when it is possible to process all of the plurality of streams through its own resources. On the contrary, when each of the switches 310, 320, 330 cannot process all of the plurality of streams through its resources, the rank of each of the plurality of streams may be identified. Then, each of the switches 310, 320, and 330 may reserve resources for transmission of streams having relatively higher ranks and may not reserve resources for transmission of streams having relatively lower ranks.

An accumulated latency field 550 may have a size of 3 octets and may indicate a latency occurring in a communication path from a talker (e.g., the first end node 301) and a listener (e.g., the second end node 302). A failure information field 560 may include a switch ID field 561 having a size of 9 octets and a failure code field 562 having a size of 1 octet. The switch ID field 561 may indicate a switch (or a bridge) that failed resource reservation. The failure code field 562 may indicate the type of failure in the resource reservation.

The declaration type may be classified into "Talker Advertise Declaration", "Talker Failed Declaration", "Listener Ready Declaration", "Listener Ready Failed Declaration", "Listener Asking Failed Declaration", and the like. Specifically, the "Talker Advertise Declaration" may indicate that the talker is to provide a service. The "Talker Failed Declaration" may indicate that a service cannot be provided (e.g., due to a resource reservation failure). Further, the "Listener Ready Declaration" may indicate that the listener is able to receive the service. The "Listener Ready Failed Declaration" may indicate that the listener cannot receive the service. The "Listener Asking Failed Declaration" may indicate a case in which the listener can receive the service even though the listener receives the "Talker Failed Declaration".

Referring again to FIG. 3 and FIG. 4, the declaration type of the advertise frame may be set to the "Talker Advertise Declaration" and the destination address of the advertise frame is set to the MAC address of the second end node 302. Then, the first end node 301 may transmit the advertise frame to the first switch 310 (S401). The first switch 310 may receive the advertise frame from the first end node 301. The first switch 310 may identify that the first end node 301 is to provide a service since the advertise frame indicates the "Talker Advertise Declaration".

Accordingly, the first switch 310 may check whether a resource to process a stream (e.g., a stream related to the service) of the first end node 301 is available or not. For example, the first switch 310 may calculate a resource required for processing the stream based on the traffic specification field included in the advertise frame, and transmit the advertise frame to the second switch 320 when the calculated resource is available in the first switch 310 (S402). The first switch 310 may configure an SRP table based on the information included in the advertise frame.

The configured SRP table may be stored in a database of the first switch 310. Here, the SRP table may be an SRP bridge base table or a SRP bridge port table defined in the IEEE 802.1Qcc. The SRP table may include at least one of information elements defined in Table 3 below. In Table 3, an information element "insertion time" may be set when a ready frame is received in response to the advertise frame.

TABLE 3

| Information Element | Description |
| --- | --- |
| Stream ID | Stream ID included in advertise frame |
| SR Class | SR Class included in advertise frame |
| Frame Size | configured based on 'traffic specification' included in advertise frame |
| VLAN ID | VLAN ID included in advertise frame |
| Insertion Time | The time at which a resource is reserved based on advertise frame |

On the other hand, the first switch 310 may generate a failed frame indicating the "Talker Failed Declaration" when there is no resource to process the stream of the first end node 301 (e.g., when a resource reserved for streams of SR Classes A and B exceeds 75% of total resources) and transmit the generated failed frame to the first end node 301. For example, when receiving the failed frame, the first end node 301 may identify that the service cannot be provided due to a failure of resource reservation or the like.

The second switch 320 may receive the advertise frame from the first switch 310. The second switch 320 may operate in the same or similar manner as the first switch 310. Thus, the second switch 320 may identify that the first end node 301 will provide a service, and transmit the advertise frame to the third switch 330 when a resource required to process the stream of the first end node 301 is available (S403). In addition, the second switch 320 may configure an SRP table (e.g., an SRP table including at least one of the information elements of Table 3) based on the information contained in the advertise frame. The configured SRP table may be registered in a database of the second switch 320. On the other hand, when there is no resource to process the stream of the first end node 301 (e.g., when a resource reserved for streams of SR Classes A and B exceeds 75% of total resources), the second switch 320 may transmit a failed frame indicating the "Talker Failed Declaration" to the first switch 310. The failed frame may be transmitted to the first end node 301 via the first switch 310.

The third switch 330 may receive the advertise frame from the second switch 320. The third switch 330 may also operate in the same or similar manner as the first switch 310. Thus, the third switch 330 may identify that the first end node 301 will provide a service, and transmit the advertise frame to the second end node 302 when a resource required to process the stream of the first end node 301 is available (S404). In addition, the third switch 330 may configure an SRP table (e.g., an SRP table including at least one of the information elements of Table 3) based on the information contained in the advertise frame. The configured SRP table may be registered in a database of the third switch 330. On the other hand, when there is no resource to process the stream of the first end node 301 (e.g., when a resource reserved for streams of SR Classes A and B is larger than 75% of total resources), the third switch 330 may transmit a failed frame indicating the "Talker Failed Declaration" to the second switch 320. The failed frame may be transmitted to the first end node 301 via the second switch 320 and the first switch 310.

The second end node 302 may receive the advertise frame from the third switch 330. The second end node 302 may identify that the first end node 301 will provide the service since the advertise frame indicates the "Talker Advertise Declaration". When the second end node 302 wants to receive the service from the first end node 301 (e.g., when the second end node 302 wants to receive the stream associated with the service), the second end node 302 may generate a ready frame including the "Listener Ready Declaration" indicating a request of the service (S405). Then, the second end node 302 may transmit the generated ready frame to the third switch 330 (S406). The ready frame may include at least one of the information elements of Table 1. Here, the stream ID indicated by the ready frame may be the same as the stream ID indicated by the advertise frame. The destination address of the ready frame may be set to the MAC address of the first end node 301.

On the other hand, when the second end node 302 does not want to receive the service from the first end node 301, the second end node 302 may generate a failed frame including the "Listener Ready Failed Declaration" indicating that the second end node 302 does not want to receive the service. Then, the second end node 302 may transmit the generated failed frame to the third switch 330. The failed frame may be transmitted to the first end node 301 via the third switch 330, the second switch 320, and the first switch 310. The first end node 301 may finally receive the failed frame from the first switch 310, and identify that the second end node 302 does not want to receive the service based on the received failed frame.

The third switch 330 may receive the ready frame from the second end node 302. Since the ready frame indicates the "Listener Ready Declaration", the third switch 330 may identify that the second end node 302 wants to receive the service. The third switch 330 may identify the stream identifier indicated by the ready frame, and check whether a SRP table including the stream identifier identical to the stream identifier of the ready frame exists or not. When the SRP table including the stream identifier identical to the stream identifier of the ready frame exists, the third switch 330 may allocate an output port (e.g., an output port connected to the second end node 302) and a resource for transmission of a stream indicated by the stream identifier. The third switch 330 may transmit the ready frame to the second switch 320 (S407).

The second switch 320 may receive the ready frame from the third switch 330. The second switch 320 may operate in the same or similar manner as the third switch 330. Therefore, the second switch 320 may identify that the second end node 302 wants to receive the service, and when there is an SRP table including the same stream identifier as the stream identifier indicated by the ready frame, the second switch 320 may allocate an output port (e.g., a port connected to the third switch 330) and a resource for transmission of the stream indicated by the stream identifier. Then, the second switch 320 may transmit the ready frame to the first switch 310 (S408).

The first switch 310 may receive the ready frame from the second switch 320. The first switch 310 may operate in the same or similar manner as the third switch 330. Therefore, the first switch 310 may identify that the second end node 302 wants to receive the service, and when there is an SRP table including the same stream identifier as the stream identifier indicated by the ready frame, the first switch 310 may allocate an output port (e.g., a port connected to the second switch 320) and a resource for transmission of the stream indicated by the stream identifier. Then, the first switch 310 may transmit the ready frame to the first end node 301 (S409).

The first end node 301 may receive the ready frame from the first switch 310. Since the ready frame indicates the "Listener Ready Declaration", the first end node 301 may identify that the second end node 302 wants to receive the service. Also, the first end node 301 may identify that a resource (i.e., a communication path) for communications between itself and the second end node 302 has been reserved. Therefore, the first end node 301 may generate a data frame including data (e.g., AVB data), and transmit the generated data frame to the second end node 302 (S410). The frame may be transmitted to the second end node 302 via the second switch 320 and the third switch 330 (i.e., via the reserved resource).

In the vehicle network, the advertise frame may be transmitted over a plurality of routes (or ports), and a communication node (e.g., a switch or bridge) may receive a plurality of advertise frames having the same stream identifier. In this case, due to a collision between the plurality of advertise frames, a communication path may not be configured properly. For example, a communication path may not be configured in the vehicle network below.

Figure 6:
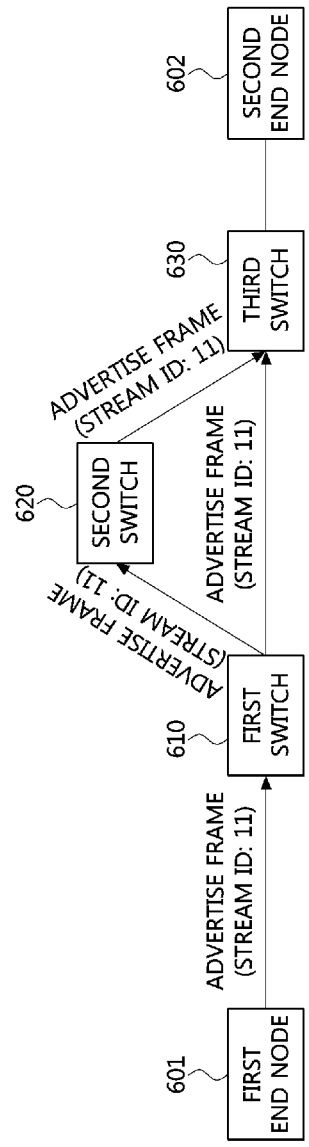
FIG. 6 is a diagram illustrating a vehicle network topology according to a third embodiment of the present disclosure.

FIG. 6 is a diagram illustrating a vehicle network topology according to a third embodiment of the present disclosure.

Referring to FIG. 6, each of communication nodes 601, 602, 610, 620, and 630 constituting a vehicle network may have the same or similar configuration as the communication node 200 described with reference to FIG. 2, and support MMRP, MVRP, MSRP, etc. The first end node 601 may be a talker providing a service (e.g., transmitting a stream associated with the service), and the second end node 602 may a listener receiving the service from the talker (e.g., receiving the stream associated with the service). Each of the switches 610, 620, and 630 may be a bridge. Here, the stream may comprise a plurality of consecutive frames. The frames may include audio video bridging (AVB) data, and the AVB data may have a form defined in the AVB specification. Also, the data included in the frames may have a priority defined in Table 1.

On the other hand, the first end node 601 may generate an advertise frame to notify of providing a service (e.g., transmitting a stream associated with the service). The advertise frame may include at least one of the information elements described in Table 2. For example, the stream ID included in the advertise frame may be set to '11'. The declaration type of the advertise frame may be set to "Talker Advertise Declaration", and a destination address of the advertise frame may be set to the MAC address of the second end node 602. The first end node 601 may transmit the advertise frame (stream ID: 11) through at least one output port. The advertise frame (stream ID: 11) may be transmitted in a broadcast manner.

The first switch 610 is able to receive the advertise frame from the first end node 601 since the first end node 601 and the first switch 610 are connected through a port. Since the advertise frame indicates the "Talker Advertise Declaration", the first switch 610 may identify that the first end node 601 is to provide the service. In addition, the first switch 610 may configure an SRP table (e.g., an SRP table including at least one of the information elements of Table 3) based on the information included in the advertise frame. The configured SRP table may be registered in a database of the first switch 610. Here, the stream ID included in the SRP table of the first switch 610 may be set to '11', and the first switch 610 may transmit the advertise frame (stream ID: 11) through at least one output port. The advertise frame (stream ID: 11) may be transmitted in a broadcast manner.

The second switch 620 is able to receive the advertise frame from the first switch 610 since the first switch 610 and the second switch 620 are connected through a port. The second switch 620 may operate in the same or similar manner as the first switch 610. Thus, the second switch 620 may identify that the first end node 601 is to provide the service, and configure an SRP table (e.g., an SRP table including at least one of the information elements of Table 3) based on the information included in the advertise frame. The configured SRP table may be registered in a database of the second switch 620. Here, the stream ID included in the SRP table of the second switch 620 may be set to '11', and the second switch 620 may transmit the advertise frame (stream ID: 11) through at least one output port. The advertise frame (stream ID: 11) may be transmitted in a broadcast manner.

The third switch 630 is able to receive the advertise frame from the first switch 610 since the first switch 610 and the third switch 630 are connected through a port. The third switch 630 may operate in the same or similar manner as the first switch 610. Thus, the third switch 630 may identify that the first end node 601 is to provide the service, and configure an SRP table (e.g., an SRP table including at least one of the information elements of Table 3) based on the information included in the advertise frame. The configured SRP table may be registered in a database of the third switch 630. Here, the stream ID included in the SRP table of the third switch 630 may be set to '1'.

Since the third switch 630 is connected through ports to the second switch 620 as well as the first switch 610, the third switch 630 may receive the advertise frame (stream ID: 11) also from the second switch 620. Since the stream ID included in the SRP table of the third switch 630 is already set to '11' and one stream may be registered in the SRP table for each stream ID, a conflict between a configuration operation of the SRP table based on the advertise frame (stream ID: 11) received from the second switch 620 and a configuration operation of the SRP table based on the advertise frame (stream ID: 11) received from the first switch 610 may occur. That is, since the stream ID of the advertise frame received from the second switch 620 is the same as the stream ID of the advertise frame received from the first switch 610, the conflict between the SRP table configuration operations based on the respective advertise frames may occur. In this case, the reservation of the communication path for the transmission of the stream may fail in the third switch 630.

Hereinafter, a method for preventing a failure in reservation of a communication path in a vehicle network will be described.

Figure 7:
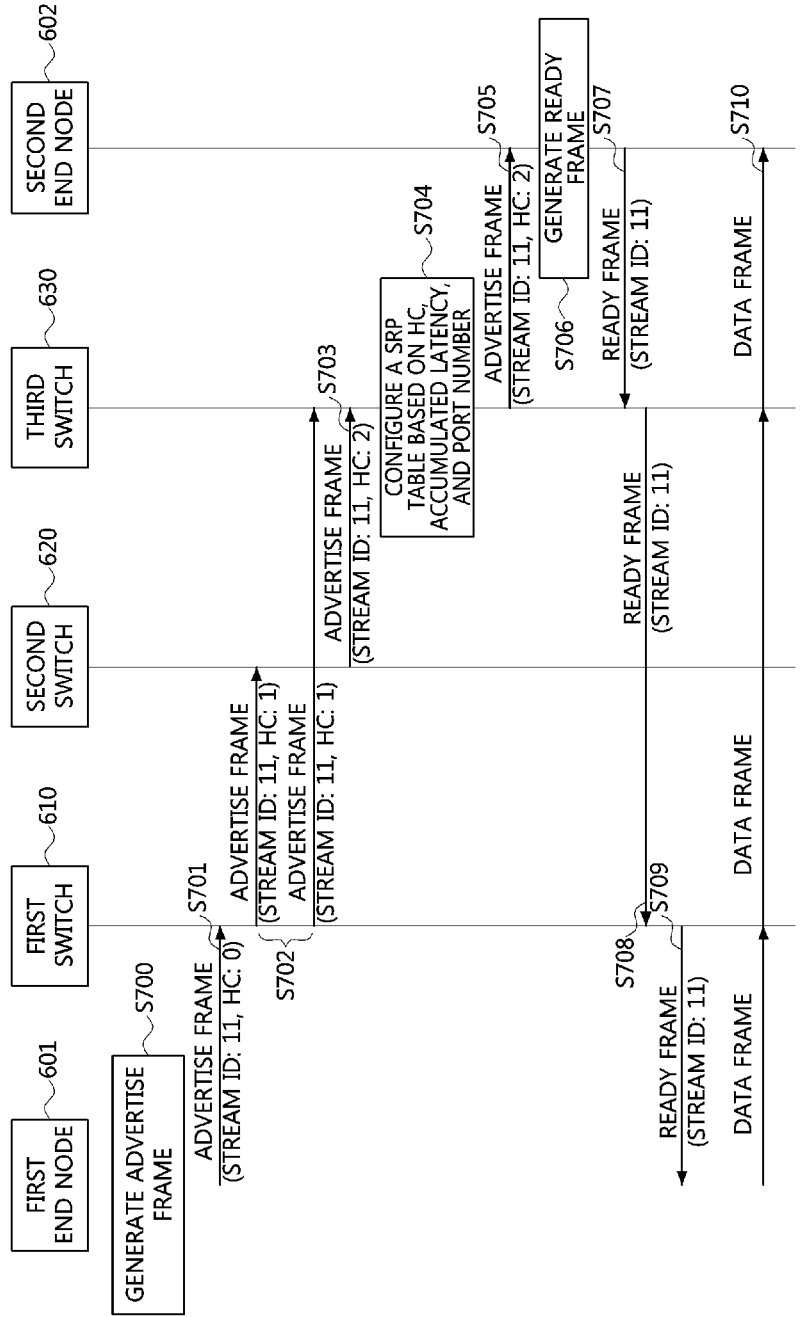
FIG. 7 is a sequence chart illustrating a frame transmission method based on a stream reservation protocol according to a second embodiment of the present disclosure.

FIG. 7 is a sequence chart illustrating a frame transmission method based on a stream reservation protocol according to a second embodiment of the present disclosure.

Referring to FIG. 7, each of communication nodes 601, 602, 610, 620, and 630 constituting a vehicle network may have the same or similar configuration as the communication node 200 described with reference to FIG. 2, and support MMRP, MVRP, MSRP, etc. The first end node 601 may be a talker providing a service (e.g., transmitting a stream associated with the service), and the second end node 602 may a listener receiving the service from the talker (e.g., receiving the stream associated with the service). Each of the switches 610, 620, and 630 may be a bridge. That is, the first end node 601 of FIG. 7 may be the first end node 601 of FIG. 6, the first switch 610 of FIG. 7 may be the first switch 610, the second switch 620 of FIG. 7 may be the second switch 620 of FIG. 6, the third switch 630 of FIG. 7 may be the third switch 630 of FIG. 6, and the second end node 602 may be the second end node 602 of FIG. 6.

Here, the stream may comprise a plurality of consecutive frames. The frames may include audio video bridging (AVB) data, and the AVB data may have a form defined in the AVB specification. Also, the data included in the frames may have a priority defined in Table 1.

On the other hand, the first end node 601 may generate an advertise frame to notify of providing a service (e.g., transmitting a stream associated with the service) (S700). The advertise frame may request to configure a communication path used for transmitting the stream, and include at least one of the information elements described in Table 2. Here, the stream ID included in the advertise frame may be set to '11', the priority of the advertise frame may be set to the SR class A, the declaration type of the advertise frame may be set to "Talker Advertise Declaration", and a destination address of the advertise frame may be set to the MAC address of the second end node 602.

In addition, the advertise frame may further include a hop count (HC). The hop count may indicate the number of communication nodes (e.g., switches or bridges) through which the advertise frame has passed in the vehicle network. Since the number of communication nodes through which the advertise frame has passed in the step S700 is 0, the hop count of the advertise frame may be set to 0.

The first end node 601 may transmit the advertise frame (stream ID: 11, HC: 0) through at least one output port (S701). The advertise frame (stream ID: 11, HC: 0) may be transmitted in a broadcast manner.

Since the first switch 610 is connected to the first end node 601 through a port, the first switch 610 may receive the advertise frame (stream ID: 11, HC: 0) from the first end node 601. Since the advertise frame (stream ID: 11, HC: 0) indicates "Talker Advertise Declaration", the first switch 610 may identify that the first end node 601 will provide a service.

The first switch 610 may configure an SRP table based on the information included in the advertise frame (stream ID: 11, HC: 0). For example, the first switch 610 may check whether other advertise frame (i.e., confliction advertise frame) having a stream ID which is the same as the stream ID (i.e., 11) included in the advertise frame received from the first end node 601 is received or not, and configure the SRP table when a confliction advertise frame other than the advertise frame from the first end node 601 is not received. The configured SRP table may be stored in the database of the first switch 610. The SRP table may include at least one of the information elements of Table 3. The SRP table may further include the hop count of the advertise frame (stream ID: 11, HC: 0) received from the first end node 601. For example, the SRP table of the first switch 610 may include "stream ID: 11, SR class: SR class A, Hop Count: 0".

Since the advertise frame (stream ID: 11, HC: 0) received from the first end node 601 is transmitted to other communication nodes via the first switch 610, the first switch 610 may increase the hop count of the advertise frame (stream ID: 11, HC: 0). For example, the first switch 610 may increase the hop count by 1. Thus, the hop count of the advertise frame in the first switch 610 may be set to 1.

The first switch 610 may transmit the advertise frame (stream ID: 11, HC: 1) containing the increased hop count through at least one output port (S702). The advertise frame (stream ID: 11, HC: 1) may be transmitted in a broadcast manner.

Since the second switch 620 is connected to the first switch 610 through a port, the second switch 620 may receive the advertise frame (stream ID: 11, HC: 1) from the first switch 610. Since the advertise frame (stream ID: 11, HC: 1) indicates "Talker Advertise Declaration", the second switch 620 may identify that the first end node 601 will provide a service.

The second switch 620 may configure an SRP table based on the information included in the advertise frame (stream ID: 11, HC: 1). For example, the second switch 620 may check whether other advertise frame (i.e., confliction advertise frame) having a stream ID which is the same as the stream ID (i.e., 11) included in the advertise frame received from the first switch 610 is received or not, and configure the SRP table when a confliction advertise frame other than the advertise frame from the first switch 610 is not received. Further, the configured SRP table may be stored in a database of the second switch 620. The SRP table may include at least one of the information elements of Table 3. Also, the SRP table may further include the hop count of the advertise frame (stream ID: 11, HC: 1) received from the first switch 610. For example, the SRP table of the second switch 620 may include "stream ID: 11, SR class: SR class A, Hop Count: 1".

Since the advertise frame (stream ID: 11, HC: 1) received from the first switch 610 is transmitted to other communication nodes via the second switch 620, the second switch 620 may increase the hop count of the advertise frame (stream ID: 11, HC: 1). For example, the second switch 620 may increase the hop count by 1. Thus, the hop count of the advertise frame in the second switch 620 may be set to 2.

The second switch 620 may transmit the advertise frame (stream ID: 11, HC: 2) containing the increased hop count through at least one output port (S703). The advertise frame (stream ID: 11, HC: 2) may be transmitted in a broadcast manner.

Since the third switch 630 is connected through ports to the first switch 610 and the second switch 620, the third switch 630 may receive the advertise frame (stream ID: 11, HC: 1) from the first switch 610 and the advertise frame (stream ID: 11, HC: 2) from the second switch 620. When multiple advertise frames having the stream ID are received, the third switch 360 may configure its SRP table based on the hop counts, the accumulated latencies, and port numbers of ports through the respective advertise frames are received (S704). An embodiment of a method for configuring an SRP table will be described as follows.

Figure 8:
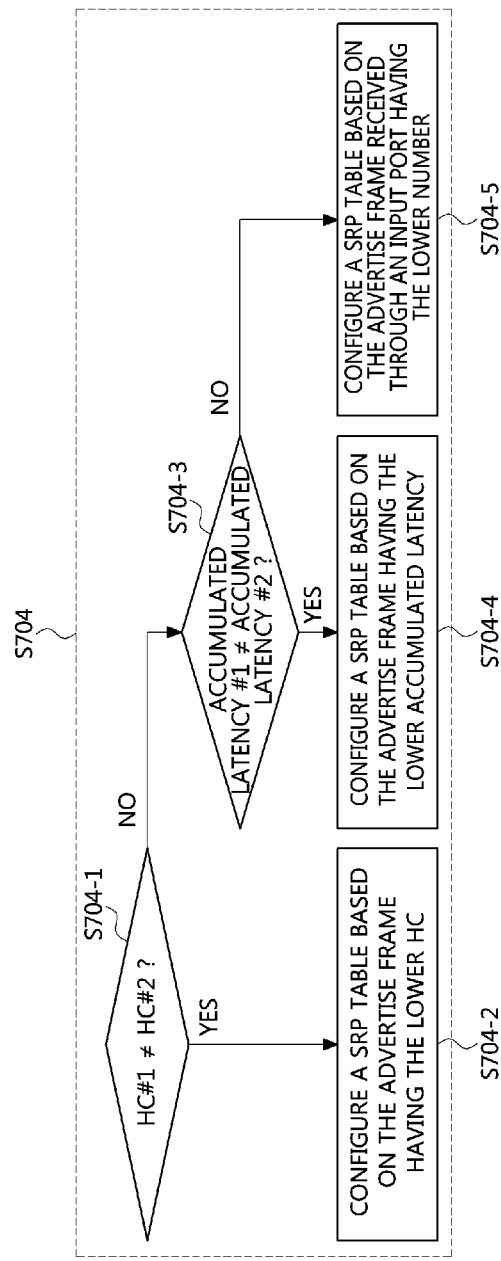
FIG. 8 is a flow chart illustrating a stream reservation protocol (SRP) table configuration method according to an embodiment of the present disclosure.

FIG. 8 is a flow chart illustrating a SRP table configuration method according to an embodiment of the present disclosure.

Referring to FIG. 8, the third switch 630 may receive a plurality of advertise frames (e.g., first advertisement frame (advertise frame#1) and second advertise frame (advertise frame#2)), and compare respective stream IDs included in the plurality of advertise frames with each other. For example, in a case that the stream ID of the first advertisement frame is different from the stream ID of the second advertisement frame, the third switch 630 may respectively configure a first SRP table for the first advertisement frame and a second SRP table for the second advertise frame.

On the other hand, since the stream ID of the first advertise frame (stream ID: 11, HC: 1) received from the first switch 610 is identical to the stream ID of the second advertise frame received from the second switch 620, the third switch 630 may compare the hop count of the advertise frame (stream ID: 11, HC: 1) received from the first switch 610 with the hop count of the advertise frame (stream ID: 11, HC: 2) received from the second switch 620 (S704-1). When the hop counts are different from each other, the third switch 630 may configure its SRP table based on the advertise frame (stream ID: 11, HC: 1) having the low hop count (S704-2). For example, the SRP table of the third switch 630 may include "stream ID: 11, SR class: SR class A, hop count: 1". In this case, a communication path for transmission of the stream may be configured as "first switch 610—third switch 630" instead of "second switch 620—third switch 630". That is, the port connected to the second switch 620 may be excluded from the communication path, and the third switch 630 may discard the advertise frame (stream ID: 11, HC: 2) received from the second switch 620.

When the plurality of advertise frames (e.g., first advertise frame and second advertise frame) are received and the stream ID and hop count of the first advertise frame are identical to those of the second advertise frame, the third switch 630 may compare the accumulated latency of the first advertise frame with the accumulated latency of the second advertise frame (S704-3). In a case that the accumulated latencies are different, the third switch 360 may configure its SRP table based on the advertise frame having the lower accumulated latency (S704-4).

On the other hand, in a case that the accumulated latencies are also equal (i.e., the stream ID, the hop count, and the accumulated latency of the first advertise frame are identical to those of the second advertise frame), the third switch 630 may compare a port number of a port through which the first advertise frame is received and a port number of a port through which the second advertise frame is received. Then, the third switch 630 may configure its SRP table based on the advertise frame received through a port having the lower port number (S704-5).

In another embodiment, the third switch 360 may configure its SRP table based on the accumulated latencies and port numbers of ports through which the respective advertise frames are received. That is, the hop counts may not be used. For example, when a plurality of advertise frames (e.g., first advertise frame and second advertise frame) are received and the stream ID of the first advertise frame is equal to that of the second advertise frame, the third switch 630 may compare the accumulated latency of the first advertise frame with that of the second advertise frame. In a case that the accumulated latencies are different, the third switch 630 may configure its SRP table based on the advertise frame having the lower accumulated latency among the first advertise frame and the second advertise frame. On the contrary, in a case that the accumulated latencies are equal (i.e., when the stream ID and the accumulated latency of the first advertise frame are equal to those of the second advertise frame), the third switch 630 may compare a port number of a port through which the first advertise frame is received with a port number of a port through which the second advertise frame is received. Then, the third switch 630 may configure its SRP table based on the advertise frame received through a port having the lower port number.

Referring again to FIG. 7, the SRP table of the third switch 630 may be configured based on the advertise frame (stream ID: 11, HC: 1) received from the first switch 610. The configured SRP table may be stored in the database of the third switch 630. The SRP table may include at least one of the information elements of Table 3. Also, the SRP table may further include the hop count of the advertise frame (stream ID: 11, HC: 1) received from the first switch 610.

For example, the SRP table of the third switch 630 may include "stream ID: 11, SR class: SR class A, hop count: 1".

Since the advertise frame (stream ID: 11, HC: 1) received from the first switch 610 is transmitted to other communication nodes via the third switch 630, the third switch 630 may increase the hop count of the advertise frame (stream ID: 11, HC: 1). For example, the third switch 630 may increase the hop count by 1. Thus, the hop count of the advertise frame in the third switch 630 may be set to 2.

The third switch 630 may transmit the advertise frame (stream ID: 11, HC: 2) containing the increased hop count through at least one output port (S705). The advertise frame (stream ID: 11, HC: 2) may be transmitted in a broadcast manner.

Since the second end node 602 is connected to the third switch 630 through a port, the second end node 602 may receive the advertise frame (stream ID: 11, HC: 2) from the second switch 630. Since the advertise frame (stream ID: 11, HC: 2) indicates "Talker Advertise Declaration", the second end node 602 may identify that the first end node 601 is to provide a service. In a case that the second end node 602 wants to receive the service from the first end node 601 (e.g., when the second end node 602 wants to receive a stream associated with the service), the second end node 602 may generate a ready frame including "Listener Ready Declaration" indicating a request of the service (S706). The ready frame may include at least one of the information elements in Table 1. The stream ID indicated by the ready frame may be identical to the stream ID indicated by the advertise frame. For example, the stream ID of the ready frame may be 11. The destination address of the ready frame may be set to the MAC address of the first end node 601. The second end node 602 may transmit the ready frame (stream ID: 11) to the third switch 630 (S707).

On the other hand, when the second end node 602 does not want to receive the service from the first end node 601, the second end node 602 may generate a failed frame including the "Listener Ready Failed Declaration" indicating that the second end node 602 does not want to receive the service. The stream ID indicated by the failed frame may be identical to the stream ID indicated by the advertise frame. For example, the stream ID of the failed frame may be 11. The second end node 602 may transmit the generated failed frame to the first end node 601 via the third switch 630 and the first switch 610. The first end node 601 may finally receive the failed frame from the first switch 610, and identify that the second end node 602 does not want to receive the service based on the received failed frame.

On the other hand, the third switch 630 may receive the ready frame from the second end node 602. Since the ready frame indicates the "Listener Ready Declaration", the third switch 630 may identify that the second end node 602 wants to receive the service. The third switch 630 may identify the stream identifier indicated by the ready frame, and check whether a SRP table including the stream identifier identical to the identified stream identifier exists or not. When the SRP table including the stream identifier identical to the identified stream identifier exists, the third switch 630 may allocate an output port (e.g., an output port connected to the second end node 602) and a resource for transmission of a stream indicated by the stream identifier. The third switch 630 may transmit the ready frame (stream ID: 11) to the first switch 610 (S708). That is, since a communication path is configured between the third switch 630 and the first switch 610 based on the advertise frame, the third switch 630 may transmit the ready frame to the first switch 610 instead of the second switch 620. In this case, since the second switch 620 cannot receive the ready frame, the second switch 620 may not allocate an output port (e.g., a port connected to the third switch 630) and a resource for transmission of the stream.

The first switch 610 may receive the ready frame (stream ID: 11) from the second switch 620. The first switch 610 may operate in the same or similar manner as the third switch 630. Therefore, the first switch 610 may identify that the second end node 602 wants to receive the service, and may allocate an output port (e.g., a port connected to the third switch 630) and a resource for transmission of the stream indicated by the stream identifier when there is an SRP table including the same stream identifier as the stream identifier indicated by the ready frame. Then, the first switch 610 may transmit the ready frame to the first end node 601 (S709).

The first end node 601 may receive the ready frame (stream ID: 11) from the first switch 610. Since the ready frame indicates the "Listener Ready Declaration", the first end node 601 may identify that the second end node 602 wants to receive the service. The first end node 601 may identify that a resource (i.e., a communication path) for communications between itself and the second end node 602 has been reserved. Therefore, the first end node 601 may generate a data frame including data (e.g., AVB data), and transmit the generated data frame to the second end node 602 (S710). The frame may be transmitted to the second end node 602 via the first switch 610 and the third switch 630 (i.e., via the reserved resource).

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. A method for configuring a communication path, wherein the method is performed in a first communication node in a vehicle network, the method comprising:
   receiving a first frame requesting to configure one communication path through which a stream is transmitted;
   receiving a second frame requesting to configure another communication path through which the stream is transmitted;
   comparing a hop count of the first frame with a hop count of the second frame, when a stream identifier of the second frame is identical to a stream identifier of the first frame;

comparing an accumulated latency of the first frame with an accumulated latency of the second frame, when the hop count of the first frame is identical to the hop count of the second frame;

determining a frame by comparing a port number of a port through which the first frame is received with a port number of a port through which the second frame is received, when the accumulated latency of the first frame is identical to the accumulated latency of the second frame;

configuring a table of the first communication node based on information included in the determined frame having a lower port number between the first frame and the second frame, when the hop count of the first frame is not identical to the hop count of the second frame; and transmitting the determined frame, wherein, when the stream identifier of the first frame is identical to the stream identifier of the second frame, a talker and a listener of the first frame are identical to a talker and a listener of the second frame, respectively.

2. The method according to claim 1, further comprising:

increasing the hop count of the determined frame, after configuring the table of the first communication node, wherein the hop count indicates a number of communication nodes through which the first frame has passed in the vehicle network.

3. The method according to claim 1, wherein the first communication node supports a multiple medium access control (MAC) reservation protocol (MMRP), a multiple virtual local area network reservation protocol (MVRP), and a multiple stream reservation protocol (MSRP).

4. The method according to claim 1, wherein the first communication node is a switch or a bridge.

5. The method according to claim 1, wherein each of the first frame and the second frame is an advertise frame, and the advertise frame includes a stream identifier, a stream reservation (SR) class, an accumulated latency, and a hop count.

6. The method according to claim 1, wherein the table is a stream reservation protocol (SRP) table used for configuration of the communication path.

7. A method for configuring a communication path, wherein the method is performed in a first communication node in a vehicle network, the method comprising:

receiving a first frame requesting to configure one communication path through which a stream is transmitted;

receiving a second frame requesting to configure another communication path through which the stream is transmitted;

comparing an accumulated latency of the first frame with an accumulated latency of the second frame, when a stream identifier of the second frame is identical to a stream identifier of the first frame;

determining a frame by comparing a port number of a port through which the first frame is received with a port number of a port through which the second frame is received, when the accumulated latency of the first frame is identical to the accumulated latency of the second frame;

configuring a table of the first communication node based on information included in the determined frame having a lower port number between the first frame and the second frame; and transmitting the determined frame having the lower port number between the first frame and the second frame, wherein, when the stream identifier of the first frame is identical to the stream identifier of the second frame, a talker and a listener of the first frame are identical to a talker and a listener of the second frame, respectively.

8. A first communication node constituting a vehicle network, the first communication node comprising:

a processor; and a non-transitory computer-readable medium which has stored thereon computer-executable instructions to cause a processor to:

receive a first frame requesting to configure one communication path through which a stream is transmitted;

receive a second frame requesting to configure another communication path through which the stream is transmitted;

compare a hop count of the first frame with a hop count of the second frame, when a stream identifier of the second frame is identical to a stream identifier of the first frame;

compare an accumulated latency of the first frame with an accumulated latency of the second frame, when the hop count of the first frame is identical to the hop count of the second frame;

determine a frame by comparing a port number of a port through which the first frame is received with a port number of a port through which the second frame is received, when the accumulated latency of the first frame is identical to the accumulated latency of the second frame;

configure a table of the first communication node based on information included in the determined frame having a lower port number between the first frame and the second frame, when the hop count of the first frame is not identical to the hop count of the second frame; and transmit the determined frame, wherein, when the stream identifier of the first frame is identical to the stream identifier of the second frame, a talker and a listener of the first frame are identical to a talker and a listener of the second frame, respectively.

9. The first communication node according to claim 8, wherein the computer-executable instructions stored on the non-transitory computer-readable medium further cause the processor to:

increase the hop count of the determined frame, after configuring the table of the first communication node, wherein the hop count indicates a number of communication nodes through which the first frame has passed in the vehicle network.

10. The first communication node according to claim 8, wherein the first communication node supports a multiple medium access control (MAC) reservation protocol (MMRP), a multiple virtual local area network reservation protocol (MVRP), and a multiple stream reservation protocol (MSRP).

11. The first communication node according to claim 8, wherein each of the first frame and the second frame is an advertise frame, and the advertise frame includes a stream identifier, a stream reservation (SR) class, an accumulated latency, and a hop count.

* * * * *